(12) United States Patent
Farrokh et al.

(10) Patent No.: US 8,176,556 B1
(45) Date of Patent: May 8, 2012

(54) METHODS AND SYSTEMS FOR TRACING WEB-BASED ATTACKS

(75) Inventors: Kamron Farrokh, Beverly Hills, CA (US); Jamie Jooyoung Park, Los Angeles, CA (US); Joseph Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 651 days.

(21) Appl. No.: 12/263,128

(22) Filed: Oct. 31, 2008

(51) Int. Cl.
*H04L 29/06* (2006.01)
(52) U.S. Cl. .......................................... 726/23; 713/188
(58) Field of Classification Search .................... 726/22, 726/23
See application file for complete search history.

(56) References Cited

U.S. PATENT DOCUMENTS

| | | | |
|---|---|---|---|
| 2004/0148281 A1* | 7/2004 | Bates et al. | 707/3 |
| 2004/0233849 A1* | 11/2004 | Cole | 370/238 |
| 2007/0136806 A1* | 6/2007 | Berman | 726/22 |
| 2008/0127338 A1* | 5/2008 | Cho et al. | 726/22 |

OTHER PUBLICATIONS

"Enhanced Reputation Filtering Identifies Compromised and Exploited Web Sites More Quickly and Accurately Than Traditional URL Filtering"; IronPort Plugs Crucial Web-Security. Sep. 22, 2008; http://newsroom.cisco.com/dlls/2008/prod_092208b.html?CMP=AF17154&vs_f=News@Cisco:+News+Releases&vs_p=News@Cisco:+News+Releases&vs_k=1.
Provos, Niels et al; "The Ghost in the Browser: Analysis of Web-Based Malware"; (accessed May 18, 2009); Google, Inc.; www.citi.umich.edu/u/provos/papers/GhostInTheBrowser.pdf.

* cited by examiner

*Primary Examiner* — Edward Zee
*Assistant Examiner* — Yogesh Paliwal
(74) *Attorney, Agent, or Firm* — Advantedge Law Group (57) ABSTRACT

A computer-implemented method for tracing attacks. The method may include identifying a first website and determining that the first website loads an attack remotely through a second website. The method may also include determining that the second website hosts the attack. The method may include performing a security action, such as blocking downloads from the second website, with respect to the second website. The attack may be a drive-by download. Corresponding systems and computer-readable media are also disclosed.

19 Claims, 6 Drawing Sheets

METHODS AND SYSTEMS FOR TRACING WEB-BASED ATTACKS

BACKGROUND

Attackers often use drive-by downloads to attempt to infect innocent computers with malware. A drive-by download may be any type of download that happens without the knowledge of a user. Drive-by downloads may download spyware, computer viruses, or various other types of malware to a user's computer without the user's knowledge.

To evade detection and increase the ability to infect others' computers, attackers who use drive-by downloads may inject iframes in legitimate websites. These iframes, which may be so small that the user does not notice them, may load a source website that performs a drive-by download. Thus, a user visiting a legitimate website may be attacked by a drive-by download.

Traditional anti-malware technologies may block legitimate websites that have been compromised as described above. But these anti-malware technologies have several disadvantages. For example, attackers may infect numerous websites with iframes that point to a single source, and the anti-malware technology may block some, but not all, of the compromised websites that point to the source. Another disadvantage of traditional anti-malware technologies is that they do not distinguish between compromised websites and source websites. Thus, these technologies may block a compromised website while the underlying problem—the source website—may not be blocked.

SUMMARY

Embodiments of the present disclosure trace attacks by determining whether a website associated with an attack is a compromised website (e.g., a website that indirectly loads a drive-by download) or a source website (e.g., a website that hosts a drive-by download). A browser on a computer may load a first website, and a monitor may detect an attempted attack (e.g., a drive-by download). A tracing module may determine that the first website loads the attack remotely through a second website. The tracing module may determine that the second website hosts the attack. Then, a security module may perform a security action with respect to the second website. For example, the security module may block communications with the second website and/or may block downloads from the second website.

In some embodiments, the first website may load a second website, and the second website may load a third website. The third website may host the attack. The first and second websites may be compromised-legitimate websites, and the third website may be a malicious-host website. The tracing module may backtrace the attack through the first and second websites and determine that the third website hosts the attack. Thus, the security module may block the third website rather than blocking the first and/or second websites.

Legitimate websites may be compromised in a variety of ways. For example, a legitimate website may be compromised by an iframe being injected into the legitimate website. The iframe may load a website that hosts an attack. In other embodiments, the legitimate website may be compromised by a script injected into the legitimate website. The script may be programmed to drop an iframe that points to a website that hosts an attack. In other embodiments, the script may be programmed to run an attack from a malicious website. Thus, to determine whether a website has been compromised, a tracing module may determine whether a malicious iframe or script has been injected into the website. Since malicious code may be heavily obfuscated, embodiments of the present disclosure may implement deobfuscation in determining whether a malicious iframe or script has been injected into a website.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure generally relates to methods and systems for tracing web-based attacks. The methods and systems disclosed herein may attempt to identify the actual source of an attack and block the source rather than merely blocking compromised websites that may not be the source of an attack. As a result, embodiments of the present disclosure may provide more comprehensive and focused protection than previous solutions.

Figure 1:
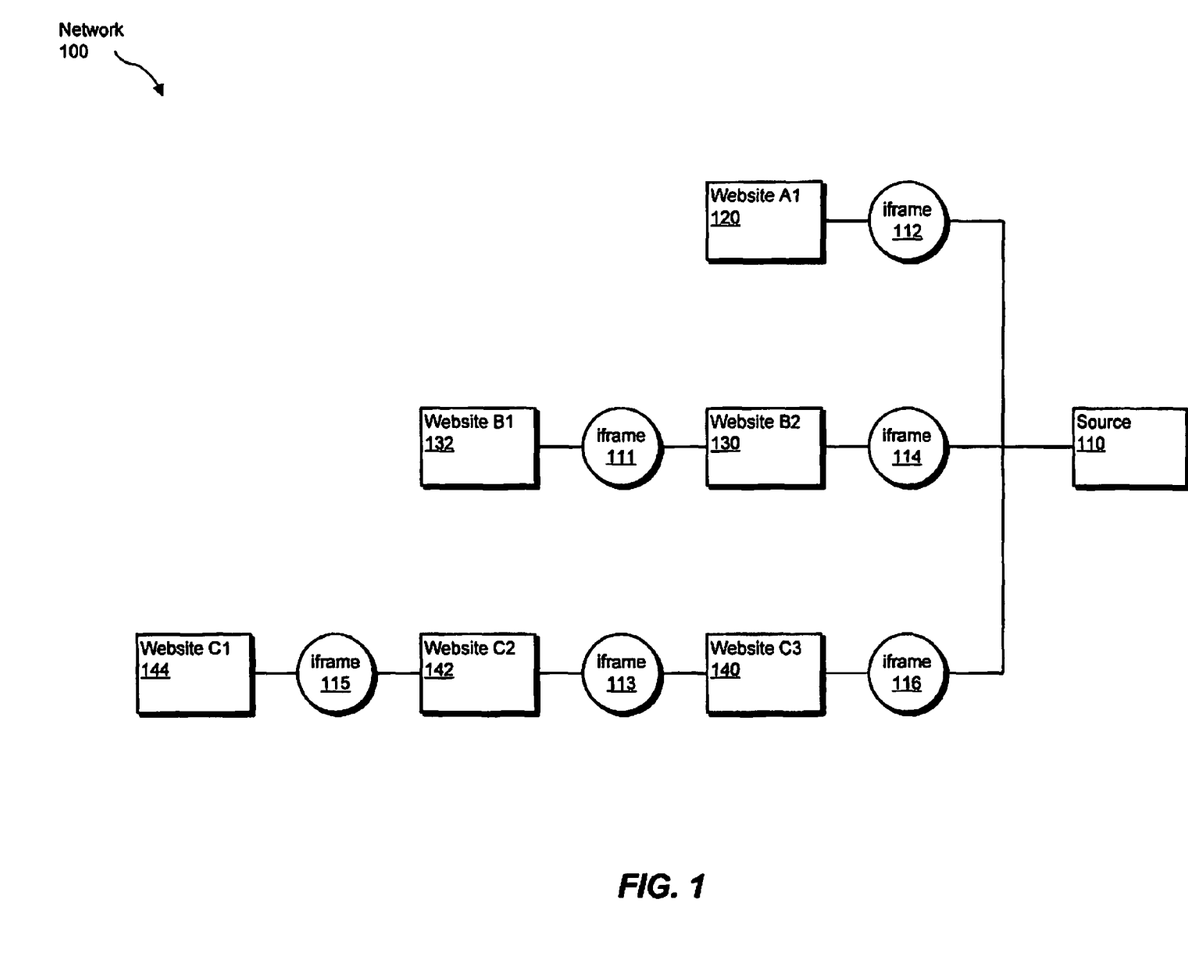
FIG. 1 is a block diagram of an exemplary network showing malicious source and compromised websites according to certain embodiments.
Figure 2:
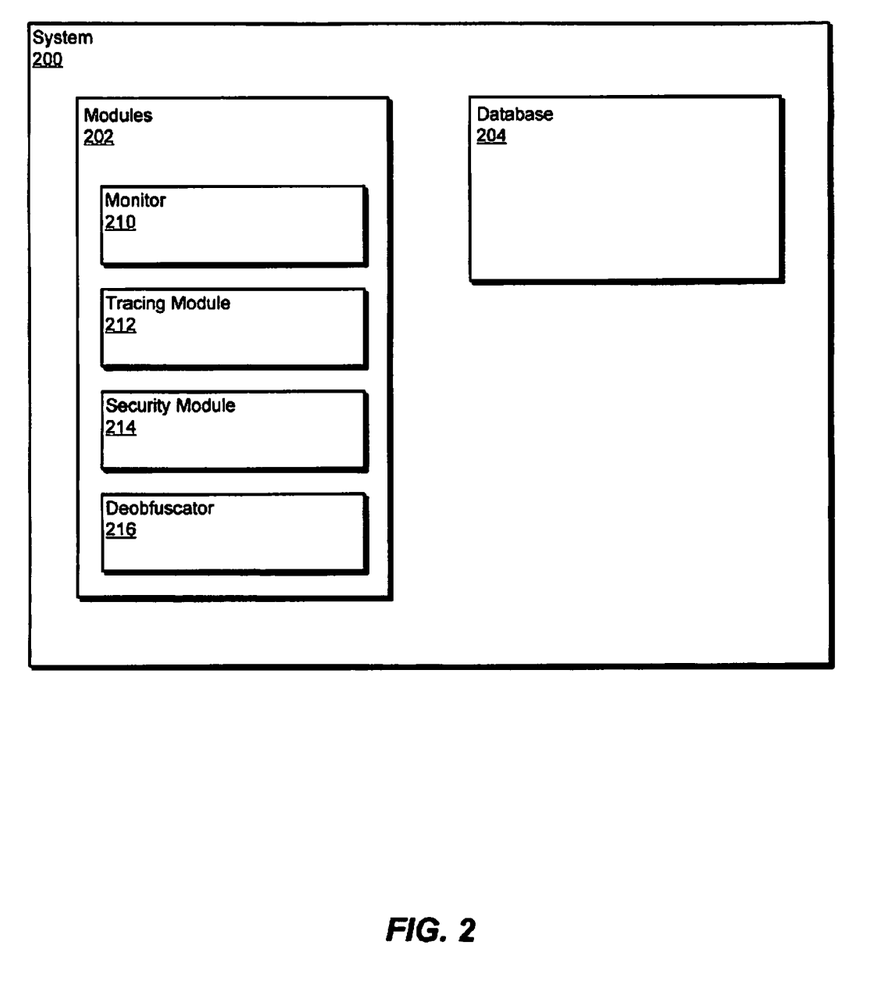
FIG. 2 is a block diagram of an exemplary system for tracing attacks according to certain embodiments.
Figure 3:
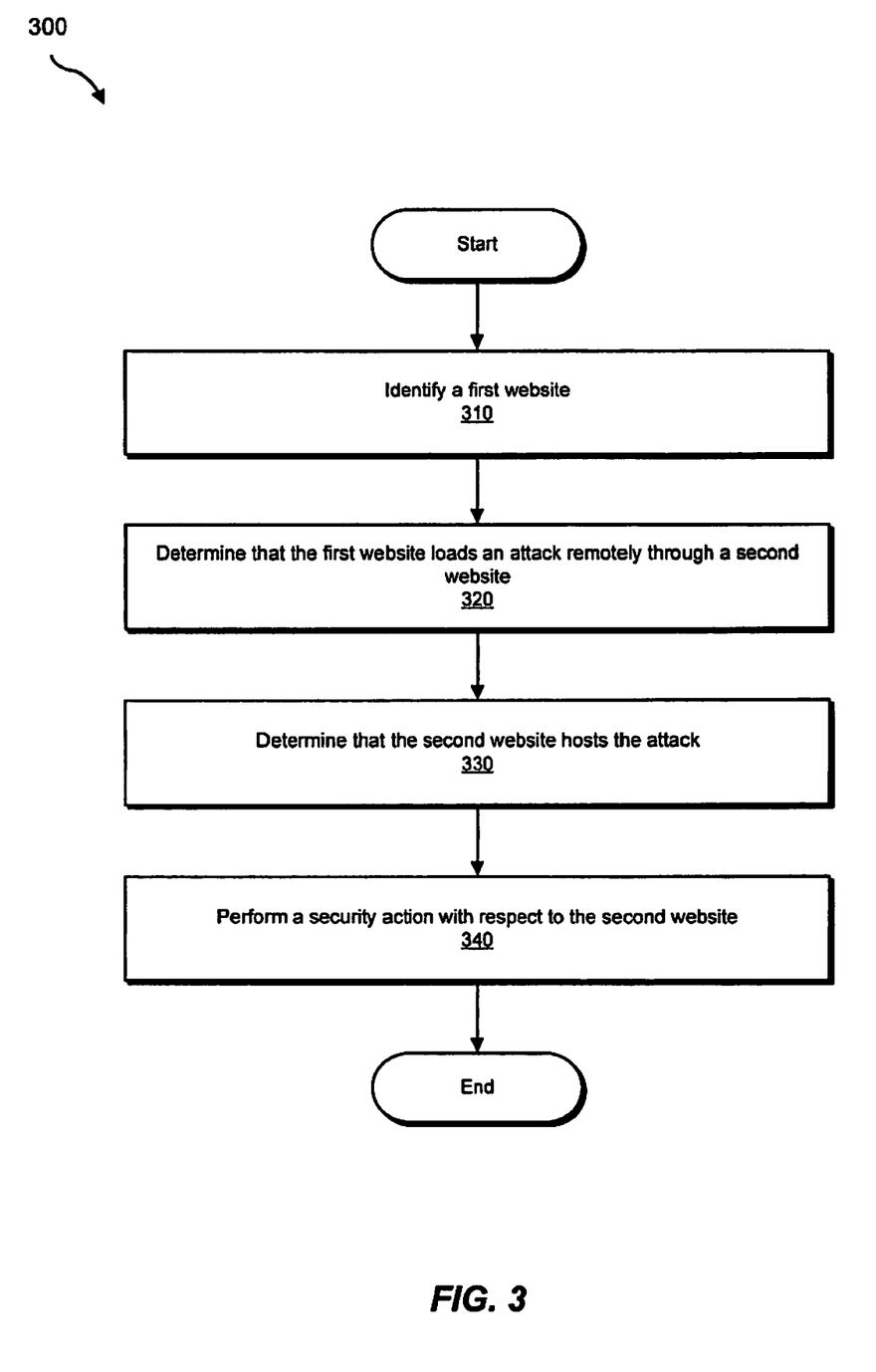
FIG. 3 is a flow diagram of an exemplary method for tracing attacks according to certain embodiments.
Figure 4:
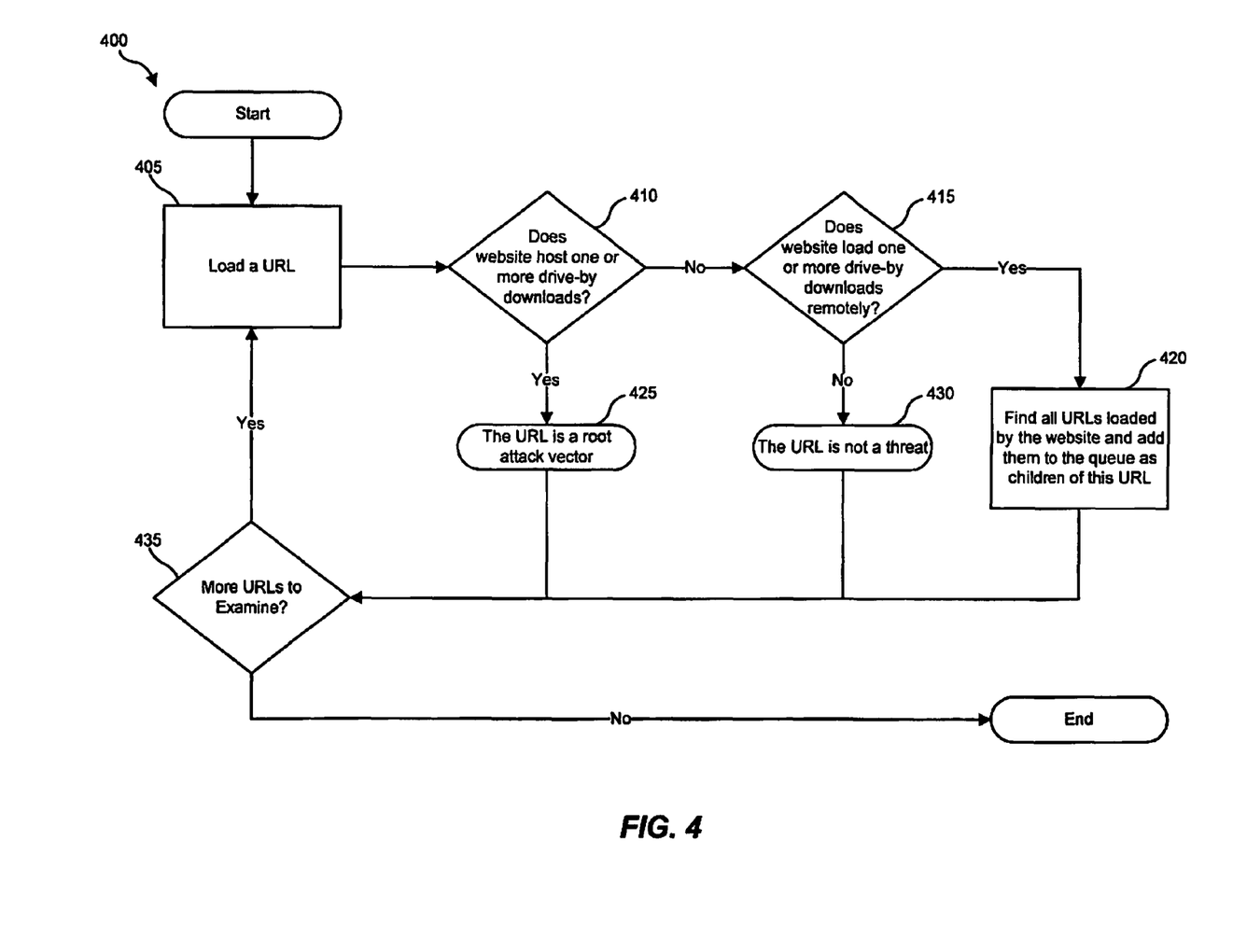
FIG. 4 is another flow diagram of an exemplary system for identifying compromised and malicious websites according to certain embodiments.

The following will describe, with reference to FIG. 1, how attackers may inject iframes and scripts into innocent websites to indirectly load attacks from the innocent websites. FIG. 2 shows an exemplary system for tracing attacks. FIGS. 3 and 4 show steps that may be performed in tracing attacks that are loaded indirectly. Descriptions of an exemplary system and an exemplary network architecture capable of implementing one or more of the embodiments described and/or illustrated herein are provided in connection with FIGS. 5 and 6.

FIG. 1 shows a network 100. Network 100 may include a source 110. Source 110 may be a computing device, such as a server, that hosts drive-by downloads. An attacker may inject code into other websites that redirect to source 110. For example, iframe 112 may be injected into a website A1 120. Website A1 120 may be a legitimate website, and iframe 112 may load data from source 110 into the background of website A1 120. Iframe 112 may be fixed at dimensions of one by one, or at any other small dimensions, to prevent a user from seeing iframe 112 and detecting the attack.

FIG. 1 also shows a compromised website B1 132. An attacker may inject an iframe 111 into website B1 132. Iframe 111 may load a website B2 130. Website B2 130 may also be a compromised website. In other words, website B2 130 may be a legitimate website with an injected iframe 114 that loads an attack from source 110. Similarly, a website C1 144 may include an iframe 115 that loads a website C2 142. Website C2 142 may include an iframe 113 that loads a website C3 140, which may include an iframe 116. Iframe 116 may load data from source 110, which may perform a drive-by download or other attack on a victim computer.

As previously mentioned, traditional anti-malware technologies may not attempt to trace attacks. As an example of a problem with traditional anti-malware software, a user of a computer may visit website A1 120, and the computer may be attacked by a drive-by download hosted on source 110. After the attack, anti-malware software may block website A1 120, but may not block source 110. Thus, if the user visits website C1 144, the computer may be attacked by source 110 again. FIGS. 2-4 present embodiments that may address these and/or other deficiencies of prior anti-malware technologies.

FIG. 2 shows components of a system 200. On or more of the components of system 200 may trace attacks and/or block sources of drive-by downloads. System 200 may include modules 202 and a database 204. Modules 202 may include a monitor 210, a tracing module 212, a security module 214, and a deobfuscator 216. Monitor 210 may be programmed to identify an attack that is made through a first website. Tracing module 212 may be programmed to determine that the first website loads the attack remotely through a second website. Security module 214 may be programmed to use an identifier of the second website to block attacks from the second website. Database 204 may store identifiers of malicious source websites and compromised websites.

In certain embodiments, one or more of modules 202 in FIG. 2 may represent one or more software applications or programs that, when executed by a computing device, may cause the computing device to perform one or more steps for tracing a web-based attack. For example, as will be described in greater detail below, one or more of modules 102 may represent software modules configured to run on one or more computing devices, such as computing device 510 in FIG. 5 and/or portions of exemplary network architecture 600 in FIG. 6. One or more of modules 202 in FIG. 2 may also represent all or portions of one or more special-purpose computers configured to perform one or more tasks required to trace and block web-based attacks.

FIG. 3 is a flow diagram of an exemplary method for tracing attacks. As shown, a monitor, such as monitor 210 shown in FIG. 2, may identify a first website (step 310). The monitor may identify the first website by identifying an attack made through the first website. The first website may be identified during a search for websites that may directly or indirectly load drive-by downloads or other attacks. The first website may also be identified when a user visits a website that directly or indirectly loads a drive-by download or other attack. The first website may be a legitimate website, which may be a website that is not intended to be used for malicious and/or illegal purposes. A legitimate website may be compromised when it has been injected with an iframe, script, or other code that directly or indirectly loads an attack.

As used herein, the term website may refer to any web page or collection of web pages, text, images, videos, or other digital assets hosted on one or more web servers. A website may contain a web page, which may typically be written in a markup language, that may be accessible via http or any other suitable protocol. Websites may be sites available through the World Wide Web and/or various other networks.

Turning back to the steps shown in FIG. 3, a tracing module, such as tracing module 212 in FIG. 2, may determine that the first website loads an attack remotely through a second website (step 320). For example, the tracing module may determine that the first website has been injected with an iframe that loads a second website. As used herein, the term iframe may refer to an inline frame, which is an html element that may embed an html document inside another html document. As previously mentioned, the size of an iframe can be defined as being small so that a user does not notice the iframe.

Determining that the first website loads an attack remotely through a second website may also comprise determining that the first website has been compromised by a script that is injected into the first website. The script may be programmed to drop an iframe that loads the second website. The script may also be programmed to run an attack from the second website. The tracing module may also be programmed determine that the first website loads an attack remotely through a second website by identifying any other code in the first website that may be used to load a second website for malicious purposes.

Next, the tracing module may determine whether or not the second website is the source website or the website that hosts the attack (step 330). A website that hosts an attack may be a source website of malicious code. For example, in a drive-by download attack, a source website may connect to the computer being attacked and may download malware to the computer.

A security module, such as security module 214, may perform a security action with respect to the second website (step 340). The security action may be any action to protect against attacks made by the second website. For example, the security action may comprise adding the website to a blocked-website list. Thus, when a browser attempts to access the website in the future (either directly or indirectly), security software may determine that the website is blacklisted and may block the website. In some embodiments, the blocked website may be included in a blocked-website list created by a security software company and distributed to clients of the company.

In various embodiments, the security action may comprise any other suitable security action. For example, the security action may comprise blocking communications with the second website and/or blocking downloads from the second website. Thus, the source website (i.e., the second website) may be blocked, and direct and indirect attacks from the source website may be blocked. As a result, legitimate websites, even if they have been compromised by an injection of a malicious iframe or script that loads an attack from the source website, may be allowed to load without risk of a user's device being attacked.

FIG. 4 shows an exemplary block diagram of a method for identifying compromised and source websites. A tracing module may load a Uniform Resource Locator (URL) associated with a website (step 405). The tracing module may determine whether the website hosts a drive-by download (step 410). If the website hosts a drive-by download, the website may be determined to be a source, and the URL may be determined to be a root-attack vector (step 425). This URL may be added to a list of blocked URLs so that drive-by downloads cannot be made from the URL.

If the website does not host one or more drive-by downloads, the tracing module may determine whether the website loads one or more drive-by downloads remotely (step 415). In other words, the tracing module may determine whether code (e.g., an iframe or script) has been injected into the website that directly or indirectly loads another website that may perform a drive-by download. If the website does not load one or more drive-by downloads remotely, the tracing module may determine that the website (and therefore the associated URL) is not a threat (step 430).

If the website loads one or more drive-by downloads remotely, the tracing module may find all URLs loaded by the website and add them to a queue as children of the URL (step 420). At step 435, the tracing module may look at the queue and determine whether there are additional URLs in the queue that need to be examined. If there are, the process restarts at step 405. Thus, embodiments of the present disclosure may trace through as many websites as necessary to identify a source of a drive-by download or other attack.

As previously mentioned, as part of the process of tracing attacks, a deobfuscator may deobfuscate malicious code that has been obfuscated. In some embodiments, a deobfuscator may deobfuscate scripts to search for malicious iframe drops and/or other code that may facilitate an attack. In some embodiments, security software may assume that all JavaScript code is heavily obfuscated and may deobfuscate the script code to determine whether the code directly or indirectly loads a drive-by download.

To perform deobfuscation, a security module may be integrated into an existing deobfuscation tool, such as SYMANTEC CORPORATION's CANARY engine. The deobfuscation tool may hook into a browser, such as INTERNET EXPLORER, and may be capable of reading the function calls and parameters as the browser interprets and executes them. The parameters may be part of relevant script functions, such as the JavaScript function document.write(string), that are commonly used to drop extra code onto a victim website.

Source websites may block Internet Protocol (IP) addresses of any device it attacks to prevent a tester from examining the malicious code on the source website. Thus, if an attack is not caught when it happens, a tracing module may not be able to trace the root attack vector, resulting in a false negative. Thus, if the attack is not caught when the attack happens, a tracing module may not be able to trace the root attack vector, resulting in a false negative. Accordingly, in some embodiments, the tracing module may programmed to assume that is has only one chance to examine each website and may therefore attempt to trace to a root attack vector immediately after an attack is detected. As a result, a tracing module may perform one or more of the steps of determining that a first website loads an attack, determining that a second website hosts the attack, and performing a security action with respect to the second website in response to identifying the attack.

In other words, a tracing module may take action to trace an attack immediately after the attack is detected. Tracing an attack right after it is detected may be important because, as previously mentioned, some source websites may block communications with IP addresses of any websites it attacks to prevent security software from examining malicious code on the source website.

Figure 5:
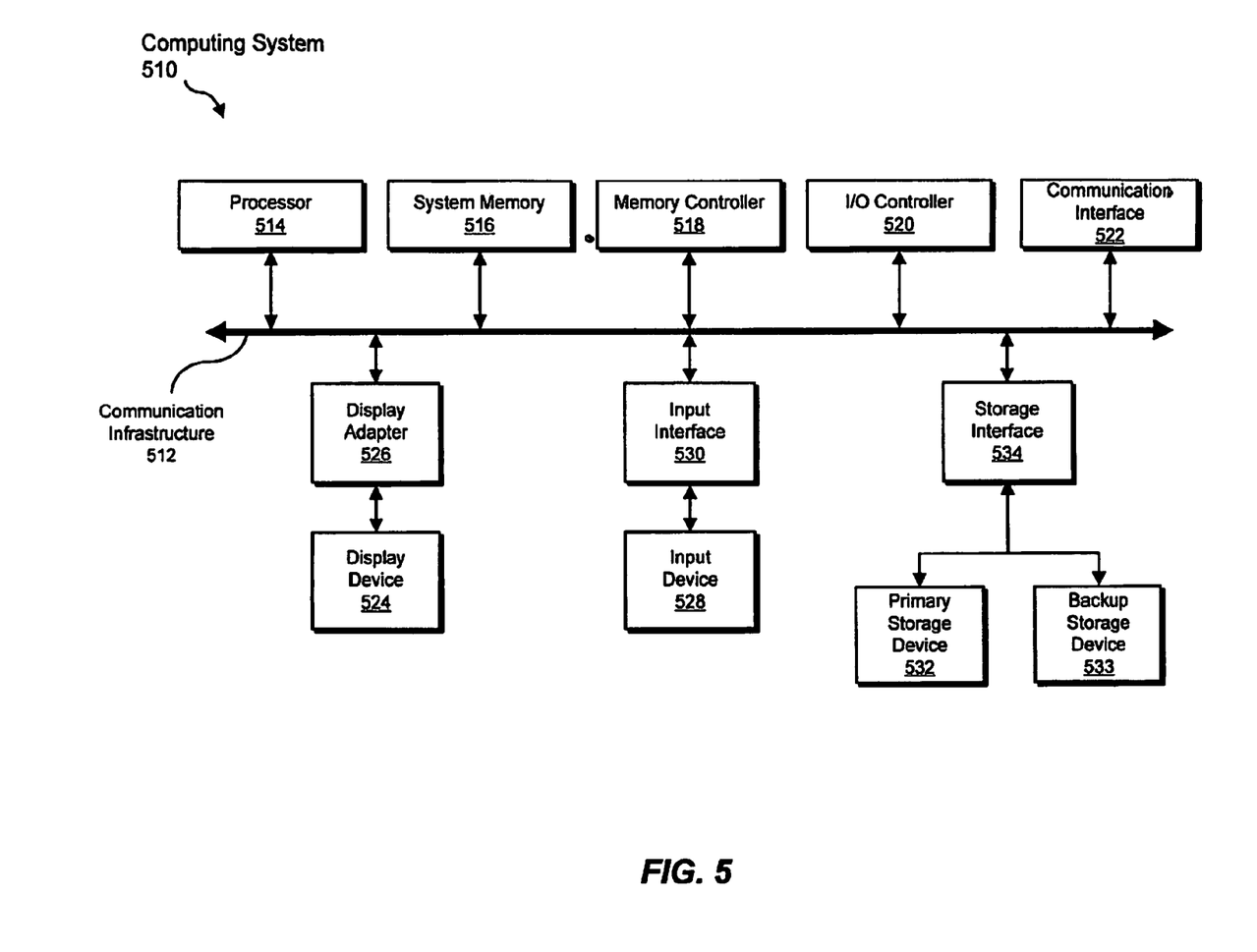
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, performing, blocking, adding, and deobfuscating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, determining, performing, blocking, adding, and deobfuscating.

I/O controller 520 generally represents any type or form of module capable of coordinating and/or controlling the input and output functions of a computing device. For example, in certain embodiments I/O controller may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, performing, blocking, adding, and deobfuscating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, performing, blocking, adding, and deobfuscating steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530.

Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, performing, blocking, adding, and deobfuscating steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, the exemplary file systems disclosed herein may be stored on primary storage device 532, while the exemplary file-system backups disclosed herein may be stored on backup storage device 533. Storage devices 532 and 533 may also be used, for example, to perform and/or be a means for performing, either alone or in combination with other elements, one or more of the identifying, determining, performing, blocking, adding, and deobfuscating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions.

Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
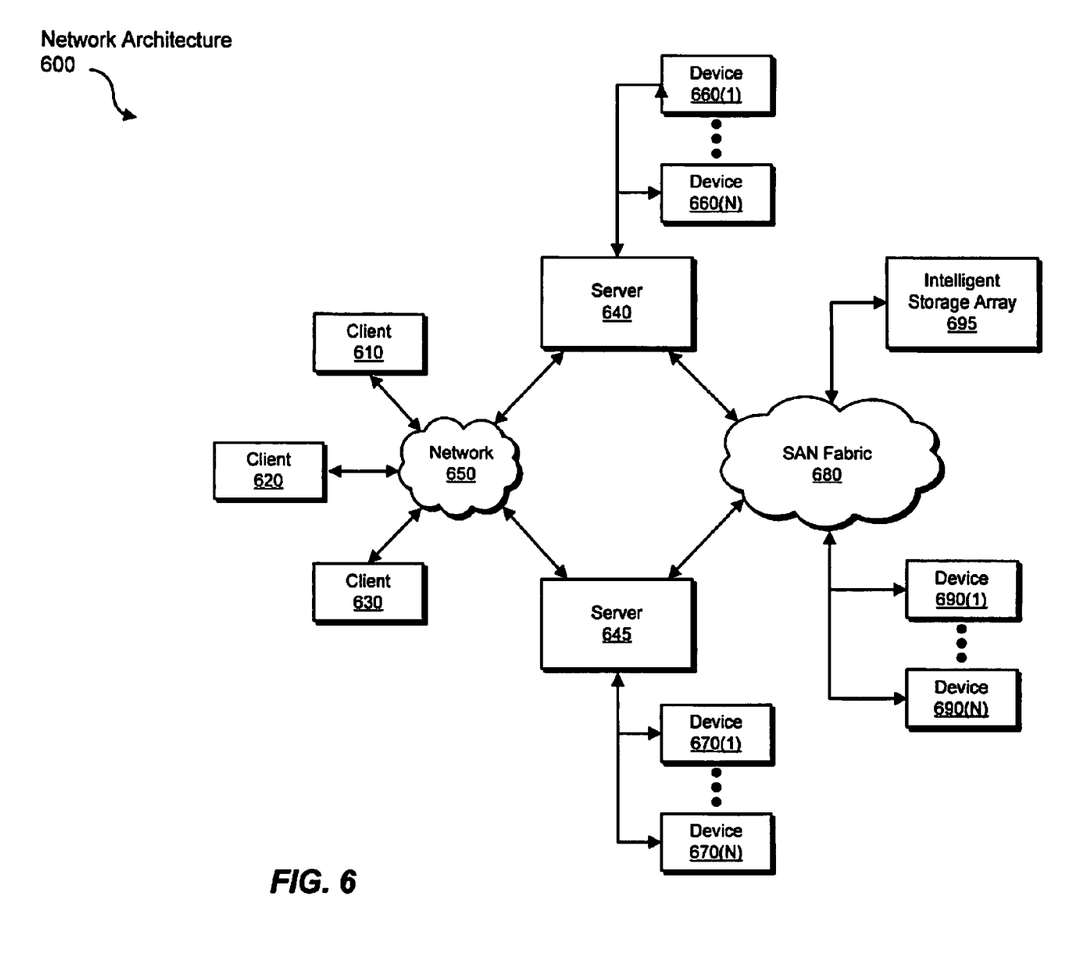
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), the Internet, a cellular network (e.g., GSM network), or any other network.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, performing, blocking, adding, and deobfuscating steps disclosed herein. Network architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, computing system 510 and/or one or more of the components of network architecture 500 may perform a computer-implemented method for tracing attacks. The computer-implemented method may comprise identifying a first website, determining that the first website loads an attack remotely through a second website, and determining that the second website hosts the attack.

After determining that the second website hosts the attack, a tracing module may perform a security action with respect to the second website. In some embodiments, an attack may be a drive-by download that attempts to download malware to a computer with a browser that is displaying the first website. According to various embodiments, the computer-implemented method may include identifying the attack. In such embodiments, determining that the first website loads the attack, determining that the second website hosts the attack, and performing a security action with respect to the second website may be performed in response to identifying the attack. In other words these steps may be performed immediately after identifying the attack such that no opportunity is lost in being able to identify the attack if the attacker attempts to block future attempts to communicate with the attacker for detection purposes.

In some embodiments, determining that the first website loads the attack remotely through the second website may comprise determining that malicious code in the first website loads a third website and determining that the malicious code in the third website loads the second website. This is the example in which the first website redirects to an additional website, which is referred to as the third website, and the additional website redirects again to the final source of the attack. In certain embodiments, a tracing module may trace through more than two websites to find a source of an attack.

In some embodiments, the first website may be a legitimate website that has been compromised. In various embodiments, the first website may have been compromised by an iframe injected into the first website. In such embodiments, determining that the second website hosts the attack may comprise determining that the iframe loads the second website and identifying malicious code on the second website. The first website, in some embodiments, may have been compromised by a script injected into the first website. The script may be programmed to drop an iframe. In such embodiments, determining that the second website hosts the attack may comprise determining that the iframe loads the second website. In other embodiments, the script may be programmed to run an attack from the second website. In such embodiments, determining that the second website hosts the attack may comprise determining that the script runs the attack from the second website.

According to various embodiments, the security action may comprise at least one of blocking communications with the second website, blocking downloads from the second website, and/or adding the second website to a blocked-website list. In various embodiments, the method may further comprise deobfuscating code in the first website to identify malicious code injected into the first website.

According to various embodiments, a system for tracing attacks may comprise a monitor programmed to identify an attack that was made through a first website. The system may also include a tracing module programmed to determine that the first website loads the attack remotely through a second website. The tracing module may also determine that the second website hosts the attack. The system may comprise a database that stores an identifier of the second website and a security module programmed to use the identifier, such as a URL, to block attacks from the second website.

In some embodiments, the attack may be a drive-by download that attempts to download malware to a computer with a browser that is displaying the first website. According to various embodiments, the first website may be a legitimate website that has been compromised. In certain embodiments, the system may comprise a deobfuscator programmed to deobfuscate code in the first website to identify malicious code injected into the first website.

According to various embodiments, the first website may have been compromised by an iframe being injected into the first website, and the tracing module may be programmed to determine that the iframe loads the second website. According to at least one embodiment, the first website may have been compromised by a script injected into the first website.

In various embodiments, a computer-readable medium may comprise one or more computer-executable instructions that, when executed by a computing device, may cause the computing device to identify a first website, determine that the first website loads an attack remotely through a second website, determine that the second website hosts the attack, and block the second website. In various embodiments, the attack may be a drive-by download that attempts to download malware to a computer with a browser that is displaying the first website. In various embodiments, the one or more computer-executable instructions, when executed by the computing device, may further cause the computing device to identify the attack.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for tracing attacks, at least a portion of the method being performed by a computing device comprising at least one processor, the computer-implemented method comprising:
   identifying a first website;
   detecting an attack loaded by the first website to the computing device, the first website having loaded the attack remotely through a second website;
   immediately upon detecting the attack loaded by the first website:
      identifying at least one website link loaded by the first website;
      tracing the website link to the second website such that the second website is unable to prevent the computing device from examining the second website;
   examining the second website to determine whether the second website hosts the attack loaded by the first website;
   determining, based on the examination of the second website, that:

the first website loaded the attack remotely through the second website;
the second website hosts the attack;
performing a security action with respect to the second website, wherein detecting the attack loaded by the first website comprises implementing a deobfuscation tool hooked into a browser of the computing device to deobfuscate malicious code by:
identifying at least one function call associated with the first website as the browser executes the function call;
examining the function call to determine whether the function call injects malicious code into the first website.

2. The computer-implemented method of claim 1, wherein:
the attack is a drive-by download that attempts to download malware to the computing device, the computing device having the browser that is displaying the first website.

3. The computer-implemented method of claim 1, further comprising:
identifying the attack, wherein determining that the first website loads the attack, determining that the second website hosts the attack, and performing the security action with respect to the second website are performed in response to identifying the attack.

4. The computer-implemented method of claim 1, wherein determining that the first website loads the attack remotely through the second website comprises:
determining that malicious code in the first website loads a third website;
determining that malicious code in the third website loads the attack remotely from the second website to the first website.

5. The computer-implemented method of 1, wherein the first website is a legitimate website that has been compromised.

6. The computer-implemented method of claim 1, wherein:
the first website has been compromised by an iframe injected into the first website;
determining that the second website hosts the attack comprises determining that the iframe loads the second website.

7. The computer-implemented method of claim 1, wherein:
the first website has been compromised by a script injected into the first website.

8. The computer-implemented method of claim 7, wherein the script comprises at least one of:
code programmed to drop an iframe, wherein determining that the second website hosts the attack comprises determining that the iframe loads the second website;
code programmed to run an attack from the second website, wherein determining that the second website hosts the attack comprises determining that the script runs the attack from the second website.

9. The computer-implemented method of claim 1, wherein the security action comprises at least one of:
blocking communications with the second website;
blocking downloads from the second website;
adding the second website to a blocked-website list.

10. The computer-implemented method of claim 9, further comprising, while blocking communications with the second website, allowing the computing device to communicate with the first website even after communications with the second website that hosts the attack have been blocked.

11. The computer-implemented method of claim 1, further comprising:
deobfuscating code in the first website to identify malicious code injected into the first website.

12. A system for tracing attacks, the system comprising:
a monitor programmed to identify a first website and to detect an attack that is made through the first website, the first website having loaded the attack remotely through a second website;
a tracing module programmed to, immediately upon identification of the attack:
identify at least one website link loaded by the first website;
trace the website link to the second website before the second website is able to prevent the tracing module from examining the second website;
examine the second website to determine whether the second website hosts the attack loaded by the first website;
the tracing module being further programmed to determine, based on the examination of the second website, that:
the first website loaded the attack remotely through the second website;
the second website hosts the attack;
a database that stores an identifier of the second website;
a security module programmed to use the identifier of the second website to block attacks from the second website;
at least one processor configured to execute the monitor, the tracing module, and the security module, wherein:
the monitor is programmed to detect the attack loaded by the first website at least in part by being programmed to implement a deobfuscation tool hooked into a browser of a computing device to deobfuscate malicious code by:
identifying at least one function call associated with the first website as the browser executes the function call;
examining the function call to determine whether the function call injects malicious code into the first website.

13. The system of claim 12, wherein:
the attack is a drive-by download that attempts to download malware to the computing device with the browser that is displaying the first website.

14. The system of claim 12, further comprising:
a deobfuscator programmed to deobfuscate code in the first website to identify malicious code injected into the first website.

15. The system of claim 12, wherein:
the first website has been compromised by an iframe injected into the first website;
the tracing module is programmed to determine that the iframe loads the second website.

16. A non-transitory computer-readable storage medium comprising one or more computer-executable instructions that, when executed by a computing device, cause the computing device to:
identify a first website;
detect an attack loaded by the first website to the computing device, the first website having loaded the attack remotely through a second website;
immediately upon detecting the attack loaded by the first website:
identify at least one website link loaded by the first website;
trace the website link to the second website such that the second website is unable to prevent the computing device from examining the second website;
examine the second website to determine whether the second website hosts the attack loaded by the first website;

determine, based on the examination of the second website, that:
the first website loaded the attack remotely through the second website;
the second website hosts the attack;
block the second website, wherein:
the one or more computer-executable instructions that cause the computing device to detect the attack loaded by the first website comprise one or more instructions that cause the computing device to implement a deobfuscation tool hooked into a browser of the computing device to deobfuscate malicious code by:
identifying at least one function call associated with the first website as the browser executes the function call;
examining the function call to determine whether the function call injects malicious code into the first website.

17. The non-transitory computer-readable storage medium of claim 16, wherein:
the attack is a drive-by download that attempts to download malware to the computing device with the browser that is displaying the first website.

18. The non-transitory computer-readable storage medium of claim 16, wherein the one or more computer-executable instructions, when executed by the computing device, further cause the computing device to identify the attack.

19. The non-transitory computer-readable storage medium of claim 16, wherein the first website is a legitimate website that has been compromised.

* * * * *